(12) United States Patent
Bandyopadhyay

(10) Patent No.: US 11,753,333 B2
(45) Date of Patent: Sep. 12, 2023

(54) TEMPORARY PROTECTION FOR HEAT TREATABLE COATED GLASS ARTICLES

(71) Applicant: SAINT-GOBAIN GLASS FRANCE, Courbevoie (FR)

(72) Inventor: Arkasish Bandyopadhyay, Tamil Nadu (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 445 days.

(21) Appl. No.: 16/771,129

(22) PCT Filed: Dec. 13, 2018

(86) PCT No.: PCT/IN2018/050836
§ 371 (c)(1),
(2) Date: Jun. 9, 2020

(87) PCT Pub. No.: WO2019/123477
PCT Pub. Date: Jun. 27, 2019

(65) Prior Publication Data
US 2021/0171392 A1    Jun. 10, 2021

(30) Foreign Application Priority Data
Dec. 20, 2017  (IN) ............................. 201741045845

(51) Int. Cl.
| | |
|---|---|
| *C03C 17/36* | (2006.01) |
| *C03C 17/00* | (2006.01) |
| *C09D 5/00* | (2006.01) |
| *C09D 5/20* | (2006.01) |
| *C09D 133/08* | (2006.01) |

(52) U.S. Cl.
CPC .......... *C03C 17/366* (2013.01); *C03C 17/007* (2013.01); *C09D 5/008* (2013.01); *C09D 5/20* (2013.01); *C09D 133/08* (2013.01); *C03C 2218/328* (2013.01); *C03C 2218/355* (2013.01)

(58) Field of Classification Search
CPC .... C08C 17/366; C09D 133/08; C09D 5/008; C09D 5/20; C03C 2218/328; C03C 17/007; C03C 2218/355

USPC ......................................................... 428/432
See application file for complete search history.

(56) References Cited

U.S. PATENT DOCUMENTS

| | | | | |
|---|---|---|---|---|
| 5,026,597 | A * | 6/1991 | Franz | C09D 5/008 |
| | | | | 428/323 |
| 6,074,741 | A * | 6/2000 | Murata | B32B 27/20 |
| | | | | 428/206 |
| 6,514,589 | B1 * | 2/2003 | Chang | G02B 5/32 |
| | | | | 428/41.3 |
| 6,682,773 | B2 | 1/2004 | Medwick et al. | |
| 2009/0044897 | A1 | 2/2009 | Thomsen et al. | |
| 2009/0220778 | A1 * | 9/2009 | Scarso | C03C 17/42 |
| | | | | 427/508 |
| 2016/0194516 | A1 * | 7/2016 | Nadaud | C09D 5/008 |
| | | | | 118/200 |

FOREIGN PATENT DOCUMENTS

WO    WO 2007/104752 A1    9/2007

OTHER PUBLICATIONS

International Search Report as issued in International Patent Application No. PCT/IN2018/050836, dated Jan. 24, 2019.

* cited by examiner

*Primary Examiner* — Hui H Chin
(74) *Attorney, Agent, or Firm* — Pillsbury Winthrop Shaw Pittman LLP

(57) ABSTRACT

A temporary protective coating for heat treatable coated glass article includes acrylic monomers or solid particle reinforced acrylic monomers is disclosed. The temporary protective coating of the present disclosure is completely devoid of oligomeric acrylates. The temporary protective coating is applied directly over a functionally coated transparent substrate to protect the coated substrate during heat treatment and handling of the coated substrate before heat treatment. The temporary protective coating is completely removed during the heat treatment leaving behind no residues thereby keeping the physical properties of the functionally coated substrate intact.

21 Claims, 2 Drawing Sheets

TEMPORARY PROTECTION FOR HEAT TREATABLE COATED GLASS ARTICLES

CROSS-REFERENCE TO RELATED APPLICATIONS

This application is the U.S. National Stage of PCT/IN2018/050836, filed Dec. 13, 2018, which in turn claims priority to Indian patent application number 201741045845 filed Dec. 20, 2017. The content of these applications are incorporated herein by reference in their entireties.

TECHNICAL FIELD

The present disclosure relates, in general to temporary protection of coated glass substrates, and more specifically to a temporary protective coating for heat treatable glass substrates provided with a functional coating.

BACKGROUND

Glass surfaces remain an enduring area of scientific and technological challenges for applications of glass, and approaches to understand and customize its surface. Interfacial behaviors with glass modifications and functional coatings represent a critical direction for glass' future. Glass substrates are increasingly being deposited with functional coatings to improve performance and durability. Widely used and popular functional coatings include solar control, conductive, antireflective and/or low emissivity coatings. Other coatings that modify the various physical properties of glass substrates such as optical, thermal or mechanical properties are also common.

Such coated glass substrates are usually shipped from manufacture sites to fabricator locations for further processing such as cutting, grinding, bending etc. There are well known shipping methods in the art for transporting a plurality of glass substrates. However, the known shipping methods are inadequate for transporting glass substrates deposited with functional coatings without causing any damage to such coatings. For example, the functionally coated surface of one coated glass substrate during handling, processing, shipping or storage could possibly damage the functional coating or scratch the adjacent substrate surface.

Historically, these functional coatings cannot survive temperatures higher than 200° C. or 250° C. without suffering some form of degradation and also cannot be subjected to further processing steps post coating due to the susceptibility of these coatings to such processing steps. As a result, these functionally coated glass substrates need to be shaped, sized, cut, ground, edge grinded and/or processed prior to the coating process as, such processing are not possible post heat treatment and coating process. This requirement provides for significant challenges for continuous production.

As an example, a glass substrate may be covered with a layer of IR or UV curable enamel, cured and then heat treated. However, the curing process does not provide mechanical and water resistance sufficient for allowing the coated glass substrate to be transported, cut, edge-worked, stocked, and/or otherwise processed, before the heat treatment. Hence such a coated glass substrate need to be heat treated immediately after production.

Temporary protective coatings that enable such coated glass substrates to be transported and further processed are also known in the art. Referring to PCT publication number 2007104752 discloses a temporary protection for a to-be-tempered glass surface having a base layer comprising enamel and a top layer comprising resin. Referring to the US publication 20160194516 assigned to the assignee of the present disclosure uses a mixture of expansive urethane acrylate oligomer for temporary protection of heat treatable glass substrates. Referring to yet another US granted patent 6682773 discloses a removable protective coating comprising polyvinyle alcohol, poly ethelene oxide, polymeric emulsion, dispersion, cellulose for protecting functionally coated articles. This protective coating is later removed by washing.

Notwithstanding all the past experience and technology which are available for temporary protection of functionally coated glass substrates, it has been discovered that although these temporary coatings are effective, they involve expansive acrylic oligomers, organic solvents and/or complex mixture of chemicals. Hence there is scope for obtaining a simpler solution for protecting functionally coated glass substrates during transport and further processing. The proposed disclosure not only reduces the use of number of expansive oligomeric acrylates but also completely eliminates the use of it. The protective coating provided by the proposed disclosure enables functionally coated glass substrates to be handled, transported and processed further (cutting, bending, edge grinding etc.) before being subjected to heat treatment. Further the protective coating composition includes solid particles that not only eliminates the use of expansive oligomeric acrylates but also act as spacers and rolling objects between adjacent coated glass substrates reducing friction and thereby offering protection from mechanical damages.

The present disclosure relates to a temporary protective coating comprising acrylic monomers or solid particle reinforced acrylic monomers. This temporary protective coating protects a functionally coated article during heat treatment and handling of the coated article before heat treatment. Coated articles comprising functional coatings ranging from single to multilayer coatings selected from magnetron deposited coatings, sputter deposited coating or chemical vapor deposited coatings are protected by depositing the temporary protective coating composition of the present disclosure directly over the functional coating of the coated article. The disclosure thus enables a transparent substrate to be manufactured and coated in one location, transported without any mechanical or chemical damages to multiple locations for various post-processing procedures and finally to another location for heat treatment and use.

The solid particles present in the temporary protective coating of the present disclosure further help to bind and re-enforce a polymeric chain of the acrylic monomers thereby contributing to the excellent hardness and scratch resistance of the coated articles.

SUMMARY OF THE DISCLOSURE

In one aspect of the present disclosure, a heat treatable coated article comprising a substrate having a first surface, a functional coating deposited over the first surface and a temporary protective coating deposited directly over the functional coating is disclosed. The temporary protective coating comprising acrylic monomers protects the functional coating during heat treatment and handling of the heat treatable coated article before heat treatment.

In one other aspect of the present disclosure, a coating composition for forming a temporary protective coating over a heat treatable substrate having a functional coating is disclosed. The coating composition comprises of acrylic monomers and is devoid of any oligomeric acrylates.

In one other aspect of the present disclosure, a coating composition for forming a temporary protective coating over a heat treatable substrate having a functional coating is disclosed. The coating composition comprises of solid particle reinforced acrylic monomers and is devoid of any oligomeric acrylates.

In another aspect of the present disclosure, a method of protecting a heat treatable coated article during heat treatment and handling of the heat treatable coated article before heat treatment is disclosed comprising the steps of providing a substrate having a first surface provided with a functional coating over at least a portion of the first surface, providing a temporary protecting coating over at least a portion of the functional coating, wherein the temporary protecting coating comprises acrylic monomers or solid particle reinforced acrylic monomers, handling the coated substrate and heating the coated substrate for removing the temporary protective coating, wherein the temperature ranges above 550° C. and below 800° C.

In yet another embodiment of the present disclosure, a method of making a heat treatable coated article that can be handled before heat treatment is disclosed comprising the steps of providing a substrate, depositing a functional coating on one surface of the substrate, curing or drying the substrate coated with the functional coating, providing a temporary protective coating over the functional coating and UV curing the substrate coated with the temporary protective coating.

Other features and aspects of this disclosure will be apparent from the following description and the accompanying drawings.

BRIEF DESCRIPTION OF THE DRAWINGS

Embodiments are illustrated by way of example and are not limited to those shown in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Wherever possible, the same reference numbers will be used throughout the drawings to refer to the same or similar parts. Embodiments disclosed herein are related to heat treatable coated article provided with a temporary protective coating.

Figure 1:
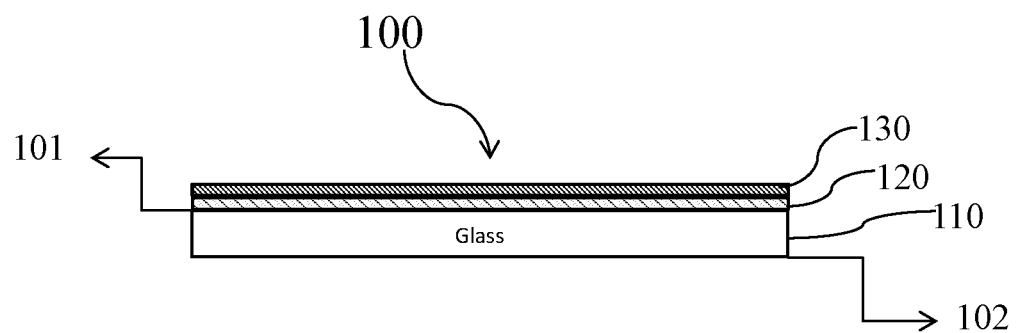
FIG. 1 illustrates a heat treatable coated article, according to one embodiment of the present disclosure.

A heat treatable coated article 100 according to one embodiment of the present disclosure is illustrated in FIG. 1. The heat treatable coated article 100 comprises of a transparent substrate 110 having a first surface 101 and a second surface 102. The first surface 101 of the transparent substrate 110 is provided with a functional coating 120. Directly provided over the functional coating 120 is a temporary protective coating 130 that protects the functional coating 120 from chemical, mechanical and weathering damages. The temporary protective coating 130 protects the functional coating 120 during heat treatment of the heat treatable coated article 100 and handling of the heat treatable coated article 100 before heat treatment.

In one embodiment of the present disclosure, the temporary protective coating 130 comprises of acrylic monomers. In another embodiment of the present disclosure, the temporary protective coating 130 comprises solid particle reinforced acrylic monomers. In all embodiment of the present disclosure, the temporary protective coating 130 is completely devoid of any acrylic oligomers. In one aspect of the embodiment, the acrylic monomers are selected from the group consisting of trimethylol propane tri acrylate (TMPTA), hexanediol diacrylate (HDDA), tricyclodecane dimethanol diacrylate (TCDDA), ethoxylated(3) trimethylolpropane triacrylate, isobornyl acrylate, tripropelene glycol diacrylate (TPGDA), stearyl acrylate, octadecyl acrylate, penta erythrol tri and tetra acrylate (PETA), tripropyleneglycol monomethyl ether acrylate (TPGMEMA) or their combinations thereof.

Acrylic monomers present in the temporary protective coating 130 in the embodiment comprising acrylic monomers ranges between 80% and 96%. Acrylic monomers present in the temporary protective coating 130 in the embodiment comprising solid particle reinforced acrylic monomers ranges between 30% and 90%. The thickness of the temporary protective coating 130 ranges between 5 microns and 100 microns. In multiple embodiments, the temporary protective coating 130 is substantially a continuous or a non-continuous coating that is devoid of any oligomeric acrylates.

In another aspect of the embodiment, the solid particle is selected from the group consisting of polymeric micro beads, solid acrylic copolymers, glass bubble, glass flakes, glass fibers, ceramic particles, acrylated silica, nano composite inorganic oxides or their combinations thereof. The size of the solid particles ranges between 5 and 100 microns. In yet another aspect of the embodiment, the temporary protective coating 130 comprises additives selected from the group consisting of adhesion promoters, photo initiators or surfactants etc. In one embodiment, the adhesion promoter is selected from the group consisting of phosphate methacrylate or modified acidic methacrylate. In another embodiment, the photo initiator is benzophenone and/or hydroxycyclohexylphenylketone.

In one embodiment, the functional coating 120 provided on the first surface 101 of the transparent substrate 100 may be a single layer or multilayer coating comprising one or more metals, non-metals, alloys, composites, compounds or their derivatives or combinations thereof. In another embodiment, the functional coating 120 may be provided by a method selected from the group consisting of magnetron deposited coatings, sputter deposited coating or chemical vapor deposited coatings. In one other embodiment, the functional coating 120 may be low emissivity coatings, solar energy reflective or absorptive coatings, thermal infrared reflective or absorptive coatings or their combinations thereof.

In one embodiment, the transparent substrate 110 may be a flat glass or a curved glass selected from the group consisting of non-tempered glass, annealed glass or strengthened glass. In yet another embodiment, the transparent substrate 110 may be a clear glass or a tinted glass. The heat treatable coated article 100 can be heated to a temperature above 550° C. and below 800° C. without damaging the functional coating 120 due to the presence of the temporary protective coating 130. During heat treatment of the heat treatable coated article 100 the temporary protective coating 130 is completely removed without leaving behind any residue on the functional coating 120 thereby keeping the physical and optical properties of the heat treated coated article unaltered.

In another aspect of the embodiment, the solid particle is selected from the group consisting of polymeric micro beads, solid acrylic copolymers, glass bubble, glass flakes, glass fibers, or their combinations thereof. The size of the solid particles ranges between 5 and 100 microns. In yet another aspect of the embodiment, the temporary protective coating 130 comprises additives selected from the group consisting of adhesion promoters, photo initiators etc. In one embodiment, the adhesion promoter is selected from the group consisting of phosphate methacrylate or modified acidic methacrylate. In another embodiment, the photo initiator is benzophenone and/or hydroxycyclohexylphenylketone.

Example 1

Preparation of Temporary Protective Coating Composition

The components of temporary protective compositions A to composition I as shown in table 1 were added in a glass beaker at specified concentrations and mixed thoroughly using a magnetic stirrer until the photo initiator was completely dissolved in each of the compositions. The contents of all compositions were then allowed to stay for a period of 30 minutes to ensure absence of bubbles. The composition A to composition I were then applied on functionally coated glass substrates using a Meyer rod at thicknesses ranging between 5 μm and 20 μm. The functionally coated glass substrates were then cured in a UV curing chamber for at least about 10 seconds. The adhesion promoter used in the below compositions is SR 9051 and irgacure 184 was used as the photo initiator.

TABLE 1

Temporary Protective Coating Composition

| Composition | Components | Concentration (%) |
|---|---|---|
| A | Polymethylmethacrylate (PMMA) beads 20 micron | 12 |
|   | TMPTA | 84 |
|   | Adhesion promoter | 0.20 |
|   | Photo initiator | 4 |
| B | TMPTA | 92 |
|   | Adhesion promoter | 0.20 |
|   | Photo initiator | 7.80 |
| C | Glass bubble (10-20 μm) | 15 |
|   | TMPTA | 77 |
|   | Adhesion promoter | 0.20 |
|   | Photo initiator | 7.80 |
| D | Urethane acrylate beads (22 μ) | 12 |
|   | TMPTA | 84 |
|   | Adhesion promoter | 0.20 |
|   | Photo initiator | 3.80 |
| E | Styrene acrylate beads (20 μ) | 12 |
|   | TMPTA | 84 |
|   | Adhesion promoter | 0.20 |
|   | Photo initiator | 4 |
| F | Polybutylmethacrylate beads (PBMA) (15 μ) | 12 |
|   | TMPTA | 84 |
|   | Adhesion promoter | 0.20 |
|   | Photo initiator | 3.80 |

TABLE 1-continued

Temporary Protective Coating Composition

| Composition | Components | Concentration (%) |
|---|---|---|
| G | PMMA beads (20 μ) | 15 |
|   | Tricyclodecane dimethanol diacrylate (TCDDA) | 47 |
|   | TMPTA | 30 |
|   | Adhesion promoter | 0.20 |
|   | Photo initiator | 7.80 |
| H | PMMA beads (20 μ) | 15 |
|   | TMPTA | 57 |
|   | Stearyl acrylate | 20 |
|   | Adhesion promoter | 0.20 |
|   | Photo initiator | 7.80 |
| I | PMMA beads 20 μ | 15 |
|   | TMPTA | 54 |
|   | Tris(2-hydroxy Ethyl)isocyanurate Triacrylate(THEICTA) | 23 |
|   | Adhesion promoter | 0.20 |
|   | Photo initiator | 7.80 |

Example 2

Durability Studies

The following durability studies were performed on the functionally coated glass substrates provided with the temporary protective compositions of the present disclosure A, B, C, G, H and I.

Erichsen Scratch Test (EST):

3-100 mm×100 mm samples were rotated in a circular manner on the machine using a sc indenter. It was observed that no scratch could be seen on the functional coating up to 6N for all above coating. Temporary protective compositions A, C, G, H and I were observed to show scratch resistance up to 8N. EST was done minimum 120 minutes after the curing.

Erichsen Scratch Test Then Tempering (ESTTT):

The above tested samples were then subjected to the tempering process (samples were kept in a Nabertherm Tempering furnace) at 690° C. for 8 minutes to remove the temporary protective layer. It was observed that no residue or corrosion could be seen on the coated glass substrates indicating that the temporary protective layer had been completely removed. No scratches up to 8 N could be seen based on the Erichsen scratch test conducted.

Erichsen Brush Test (EBT):

Samples coated with the temporary protective layer were subjected to a brush test in water. This test was conducted to understand and check the adhesion of the temporary protective layer to the coated glass substrates which would be critical during the washing step during processing. All the above mentioned samples showed no delamination of the temporary protective layer after the conclusion of the test.

Abrasion Test:

Using a CS-10F wheel on a taber abrasion machine 2 samples provided with composition A were rotated in a circular manner for 500 cycles. Initial weights and final weights were considered and no significant weight loss was observed. Results of the durability studies are summarized in table 2.

TABLE 2

Results of Durability Tests

| Composition | EST | EBT | ESTTT |
|---|---|---|---|
| A | Pass @ 8N | No pinholes, scratches or delamination observed | Pass @ 8N |
| B | Pass @ 6N | No pinholes, scratches or delamination observed | Pass @ 6N |
| C | Pass @ 8N | No pinholes, scratches or delamination observed | Pass @ 8N |
| G | Pass @ 8N | No pinholes, scratches or delamination observed | Pass @ 8N |
| H | Pass @ 8N | No pinholes, scratches or delamination observed | Pass @ 8N |
| I | Pass @ 8N | No pinholes, scratches or delamination observed | Pass @ 8N |

CASS & SO2 Testing:

Samples coated with the temporary protective layer were subjected to different climatic chambers. The climatic chambers were set at conditions that mimic harsh weather conditions. The size of the samples (200×200 mm) were chosen in order to maximize visibility of the corrosion. The samples were observed for corrosion after 1, 2 and 4 days. The tested samples were then tempered on the furnace at 690° C. for 9 minutes. It was observed that the samples coated with the temporary protective layer of the present disclosure did not show any signs of corrosion both during the CASS and SO2 testing as well after the tempering process.

INDUSTRIAL APPLICABILITY

The heat treatable coated article 100 of the present disclosure can be transported to a distant location and be processed before being heat treated to obtain a heat treated coated article. Hence heat treatable coated article 100 of the present disclosure has the advantage of being able to be manufactured and coated in one location, transported without any mechanical or chemical damages to multiple processor locations for various post-processing procedures and finally to a fabricator location for heat treatment and use. The temporary protective coating is completely removed during the heat treatment of the heat treatable coated article 100 without leaving behind any residue deposition. This helps in retaining the optical and performance properties of the functionally coated glass.

Figure 2:
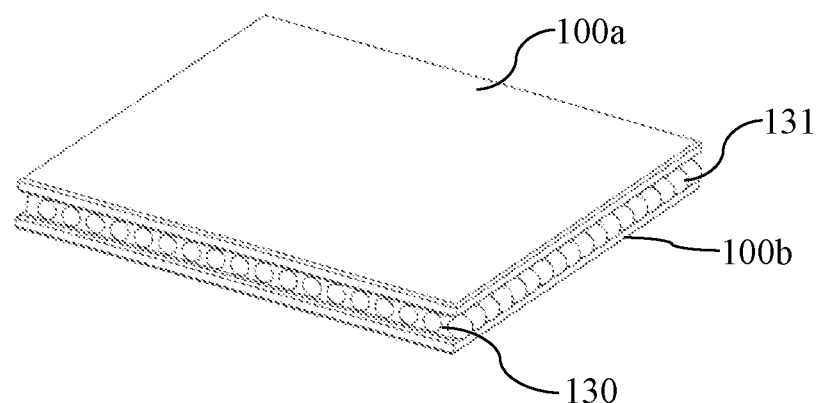
FIG. 2 illustrates protection mechanism of the temporary protective coating, according to one embodiment of the present disclosure.

The solid particles present in the temporary protective coating act as spacer or rolling objects and protect the functional coated glass substrates from damage during transport. The effect of solid particles during transport is depicted in FIG. 2. The solid particle 131 present in the temporary coating 130 get aligned between adjacent heat treatable coated articles 100a and 100b as depicted in FIG. 2. The friction between adjacent functional coated substrates is reduced by the presence of solid particles thereby reducing mechanical damage during transport and storage of the functionally coated substrates. In more than one embodiments of the present disclosure where the temporary protective coating 130 comprises of acrylic monomers, the acrylates form an organic layer on UV curing and provides for mechanical and chemical protection to the functional coated substrates.

Although the temporary protective coating is envisaged herein to protect functional coatings on glass substrates, protection of non-functional coatings on glass substrates including but not limiting to enameled glass and lacquered glass and glass substrates without any such coatings using the temporary protective coating composition of the present disclosure shall also fall within the scope of the present disclosure.

A method of protecting a coated article during heat treatment and handling of the coated article before heat treatment is also disclosed. The method comprises the steps of providing the temporary protective coating 130 of the present disclosure over the surface of a coated glass article. In one embodiment, the temporary protective coating may be provided on at least a portion of the surface of the coated article in a continuous or a non-continuous process. The coated article provided with the temporary protective coating can be stored and transported to distant locations without damaging the functional coating before being heat treated. Further the coated article may also be subjected to post-processing procedures not limiting to cutting, edge grinding, beveling, drilling, sizing, finishing etc. The coated article is finally heat treated at 650° C. after transport, handling and/or desired post-processing procedures.

Figure 3:
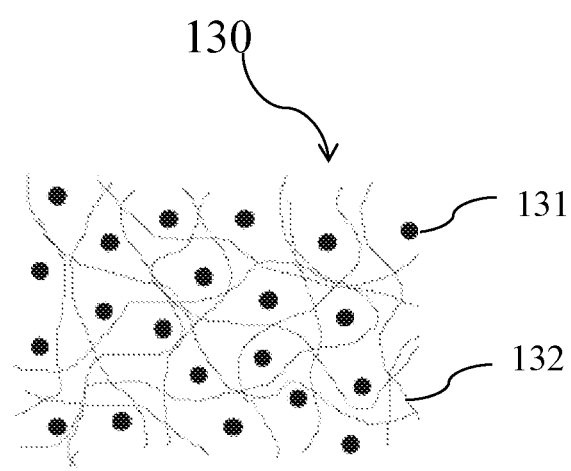
FIG. 3 illustrates a solid particle reinforced polymers, according to one embodiment of the present disclosure.

The present disclosure also discloses a method of making the heat treatable coated article 100 of the present disclosure that can be handled before heat treatment. The method comprises the steps of cleaning the surface of the coated article to remove dust and other contaminations including finger prints. The temporary protective coating composition of the present disclosure is then prepared as illustrated in example 1 and applied on the surface of the cleaned functionally coated article using a Meyer Rod. The thickness of the temporary protective coating ranges between 5 to 100 μm. The coated article is then subjected to UV curing process where the acrylic monomers present in the temporary protective coating 130 forms a polymeric structure 132 as illustrated in FIG. 3. The resulting heat treatable coated article 100 can be further handled and heat treated to a temperature ranging above 600° C. and below 800° C. to completely remove the temporary protective coating.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

LIST OF ELEMENTS

Title: Temporary Protection for Heat Treatable Coated Glass Articles
100 Heat Treatable Coated Article
100a Heat Treatable Coated Article 1
100b Heat Treatable Coated Article 2
101 First Surface
102 Second Surface
110 Glass Substrate
120 Functional Coating
130 Temporary Protective Coating
131 Solid Particles
132 Polymeric Chain

I claim:

1. A heat treatable coated article comprising:
    a transparent substrate having a first surface;
    a functional coating deposited over at least a portion of the first surface;
    a temporary protective coating deposited over at least a portion of the functional coating;
    wherein the temporary protective coating comprising acrylic monomers protects the functional coating during heat treatment and handling of the heat treatable coated article before heat treatment, wherein the temporary protective coating is devoid of any oligomeric acrylates, wherein the acrylic monomers are optionally reinforced with solid particles, and wherein the heat treatment involves heating to a temperature ranging above 550° C. and below 800° C.

2. The heat treatable coated article as claimed in claim 1, wherein the functional coating consists of single layer or multilayer coating comprising one or more metals, non-metals, alloys, composites, compounds or their derivatives or combinations thereof.

3. The heat treatable coated article as claimed in claim 1, wherein the functional coating is selected from the group consisting of magnetron deposited coatings, sputter deposited coating and chemical vapor deposited coatings.

4. The heat treatable coated article as claimed in claim 1, wherein the functional coating comprises of low emissivity coatings, solar energy reflective or absorptive coatings, thermal infrared reflective or absorptive coatings or their combinations thereof.

5. The heat treatable coated article as claimed in claim 1, wherein the temporary protective coating comprises of acrylic monomers selected from the group consisting of trimethylol propane tri acrylate (TMPTA), hexanediol diacrylate (HDDA), tricyclodecane dimethanol diacrylate (TCDDA), ethoxylated(3) trimethylolpropane triacrylate, isobornyl acrylate, tripropylene glycol diacrylate (TPGDA), stearyl acrylate, octadecyl acrylate, penta erythrol tri and tetra acrylate (PETA), tripropyleneglycol monomethyl ether acrylate (TPGMEMA) and any combination thereof.

6. The heat treatable coated article as claimed in claim 1, wherein a percentage of an amount of acrylic monomers present in the temporary protective coating relative to an amount of all components present in the temporary protective coating is between 80% and 96%.

7. The heat treatable coated article as claimed in claim 1, wherein a percentage of an amount of solid particle reinforced acrylic monomers present in the temporary protective coating relative to an amount of all components present in the temporary protective coating is between 30% and 90%.

8. The heat treatable coated article as claimed in claim 1, wherein the temporary protective coating has a thickness ranging between 5 microns and 100 microns.

9. The heat treatable coated article as claimed in claim 1, wherein the temporary protective coating is a continuous or a non-continuous coating.

10. The heat treatable coated article as claimed in claim 1, wherein the temporary protective coating includes additives selected from the group consisting of adhesion promoters and photo initiators, wherein the adhesion promoter is phosphate methacrylate or modified acidic methacrylate and photo initiator is benzophenone or hydroxycyclohexylphenylketone.

11. The heat treatable coated article as claimed in claim 1, wherein the solid particle is selected from the group consisting of polymeric micro beads, glass bubble, glass flakes, glass fibers and any combination thereof.

12. The heat treatable coated article as claimed in claim 1, wherein the size of the solid particle ranges between 5 and 100 microns.

13. The heat treatable coated article as claimed in claim 1, wherein the transparent substrate may be a flat glass or a curved glass.

14. The heat treatable coated article as claimed in claim 1, wherein the transparent substrate is selected from the group consisting of non-tempered glass, annealed glass and strengthened glass.

15. The heat treatable coated article as claimed in claim 1, wherein handling of the heat treatable coated article includes cutting, edge grinding, beveling, drilling, sizing, finishing, storing and transporting of the heat treatable coated article.

16. The heat treatable coated article as claimed in claim 1, wherein the temporary protective coating is completely removed during the heat treatment.

17. A coating composition for forming a temporary protective coating over a heat treatable coated article as claimed in claim 1 having a functional coating, wherein the coating comprises:
- acrylic monomers selected from the group consisting of trimethylol propane tri acrylate (TMPTA), hexanediol diacrylate (HDDA), tricyclodecane dimethanol diacrylate (TCDDA), ethoxylated(3) trimethylolpropane triacrylate, isobornyl acrylate, tripropylene glycol diacrylate (TPGDA), stearyl acrylate, octadecyl acrylate, penta erythrol tri and tetra acrylate (PETA), tripropyleneglycol monomethyl ether acrylate (TPGMEMA) and any combination thereof; and
- optionally solid particle for reinforcing acrylic monomers selected from the group consisting of polymeric micro beads, solid acrylic copolymers, glass bubble, glass flakes, and any combination thereof, wherein the temporary protective coating is devoid of any oligomeric acrylates.

18. A method of protecting a coated article during heat treatment and handling of the coated article before heat treatment, comprising:
- providing a transparent substrate having a first surface provided with a functional coating over at least a portion of the first surface;
- providing a temporary protecting coating composition as claimed in claim 17 over at least a portion of the functional coating;
- curing the coated substrate;
- handling the coated substrate; and
- heating the coated substrate for removing the temporary protective coating, wherein the temperature ranges above 550° C. and below 800° C.

19. The method as claimed in claim 18, wherein the solid particles present in the temporary protective coating act as spacers and rolling objects that protects the functional coating of the heat treatable coated article from mechanical and chemical damages during heat treatment and handling.

20. A method of making a heat treatable coated article that can be handled before heat treatment, comprising:
- providing a transparent substrate;
- depositing a functional coating on one surface of the substrate;
- curing or drying the substrate coated with the functional coating;
- providing a temporary protective coating composition as claimed in claim 17 over the functional coating; and
- UV curing the substrate coated with the temporary protective coating.

21. The method as claimed in claim 20, further involves handling the substrate coated with the temporary protective coating and heat treating the handled substrate to a temperature ranging above 600° C. and below 800° C. to completely remove the temporary protective coating.

* * * * *